Patented Aug. 26, 1952

2,608,505

UNITED STATES PATENT OFFICE 2,608,505

METHOD OF PREPARING ARSENATE-CONTAINING PLANT-PROTECTIVE AGENTS

Sven Vilhelm Lundbäck, Stockholm, and Sten Gunnar Sandström, Solna, Sweden, assignors to Bolidens Gruvaktiebolag, Skelleftehamn, Sweden, a joint-stock company, limited, of Sweden No Drawing. Application July 30, 1946, Serial No. 687,206. In Sweden February 23, 1946

7 Claims. (Cl. 167—15)

This invention relates to plant-protective agents for control of injurious insects, fungi and rot and also improved methods of producing such agents, and concerns more particularly plant-protective agents for the said purposes containing, as active components, difficultly soluble zinc arsenates with small amounts of chromium, iron and/or manganese and possibly also small amounts of halogens such as fluorine.

Zinc arsenates have not been used to a large extent for plant protection due to their tendency to injure the plants, which is connected with their comparatively high solubility and insufficient stability. We have found, however, that zinc arsenate is changed by small amounts of the metals chromium, iron or manganese, which make the arsenate very well suited for plant protective purposes. Thus we have found that already at such a low content of chromium as 1 per cent by weight of the compound the preparation will obtain certain properties which are not present in common zinc arsenate. This change of the arsenate molecule improves the stability and reduces the solubility of the compound so that arsenate injuries on plants can be avoided. Furthermore, the particle size becomes smaller, the insecticidal effect is increased and the suspension power and adherence are improved. Thus the usefulness of the arsenate in the field as a plant-protective agent is highly increased.

We have also found it suitable that the arsenate molecule contains a small amount of halogens such as fluorine.

The following is a specific example of a method used for producing zinc arsenates according to this invention:

40 parts of zinc oxide and 5 parts of sodium fluoride were suspended in 1000 parts of water, 70 parts of arsenic acid (containing 65% $As_2O_5$) were then added and the mixture was heated at a temperature of 90° C. After one hour 5 parts of sodium bichromate were added and then 5 parts of sodium thiosulphate. After one hour 20 parts zinc oxide were added and after one more hour the reaction was interrupted. The resulting precipitate was then filtered out, washed and dried.

The chromium may also be added in the form of other water soluble chromium compounds. Other reducing agents than sodium thiosulphate—inorganic or organic—may be used, for instance sodium sulphite, arsenious acid or other tervalent arsenical compounds and others. In case chromium is added in bivalent or tervalent form it is, of course, not necessary to add any reducing agent.

The preparations of the invention contain from 15% to 50% $As_2O_5$, from 40% to 75% ZnO, from 1% to 15% $Cr_2O_3$. The preparations may also contain halogens such as fluorine. For general use such arsenates containing 30–40% $As_2O_5$ and up to 4% F have been found most suitable.

The products described above may be used for spraying or dusting purposes in mixture with other insecticidal and/or fungicidal preparations.

It is to be understood that the invention is not limited to the embodiments and procedures herein specifically described, but may be carried out in other ways without departing from its spirit as defined by the attached claims.

Having thus described our invention we declare that what we claim is:

1. A method for producing zinc arsenates for plant protective purposes comprising preparing an aqueous suspension of zinc arsenate, precipitating in said suspension additional arsenate by adding small amounts of a compound selected from the class consisting of chromium, iron and manganese compounds, and filtering and washing the resulting precipitate.

2. A method for producing zinc arsenates for plant protective purposes comprising preparing an aqueous suspension of zinc arsenate containing a halogen compound, precipitating in said suspension additional arsenate by adding small amounts of a compound selected from the class consisting of chromium, iron and manganese compounds, and filtering and washing the resulting precipitate.

3. A method for producing zinc arsenates for plant protective purposes comprising preparing an aqueous suspension of zinc arsenate, precipitating in said suspension additional arsenate by adding small amounts of a compound selected from the class consisting of chromium, iron and manganese compounds, adding zinc oxide, and filtering and washing the resulting precipitate.

4. A method for producing zinc arsenates for plant protective purposes comprising preparing an aqueous suspension of zinc arsenate, precipitating in said suspension additional arsenate by adding small amounts of a chromium compound selected from the class consisting of bivalent and tervalent chromium compounds, and filtering and washing the resulting precipitate.

5. A method for producing zinc arsenates for plant protective purposes comprising preparing an aqueous suspension of zinc arsenate, precipitating in said suspension additional arsenate by adding small amounts of a hexavalent chromium compound and a reducing agent, and filtering and washing the resulting precipitate.

6. A method for producing zinc arsenates for plant protective purposes comprising preparing an aqueous suspension of zinc arsenate containing a halogen compound, precipitating in said suspension additional arsenate by adding small amounts of a hexavalent chromium compound and a reducing agent, and filtering and washing the resulting precipitate.

7. A method for producing zinc arsenates for plant protective purposes comprising preparing an aqueous suspension of zinc arsenate containing a fluorine compound, precipitating in said suspension additional arsenate by adding small amounts of a hexavalent chromium compound and a reducing agent, adding zinc oxide, and filtering and washing the resulting precipitate.

SVEN VILHELM LUNDBÄCK.
STEN GUNNAR SANDSTRÖM.

REFERENCES CITED

The following references are of record in the file of this patent:

UNITED STATES PATENTS

| Number | Name | Date |
|---|---|---|
| 1,996,016 | Hagood | Mar. 26, 1935 |
| 2,029,264 | Klosky | Jan. 28, 1936 |
| 2,139,747 | Hager | Dec. 13, 1938 |
| 2,366,612 | Hager | Jan. 2, 1945 |
| 2,376,740 | Waters et al. | May 22, 1945 |